(12) United States Patent
Kurihara

(10) Patent No.: US 6,449,547 B1
(45) Date of Patent: Sep. 10, 2002

(54) INTEGRATED CONTROL SYSTEM FOR ENGINE AND AUTOMATIC TRANSMISSION

(75) Inventor: Masaru Kurihara, Tokyo-To (JP)

(73) Assignee: Fuji Jukogyo Kabushiki Kaisha, Tokyo-To (JP)

(*) Notice: Subject to any disclaimer, the term of this patent is extended or adjusted under 35 U.S.C. 154(b) by 0 days.

(21) Appl. No.: 09/482,267

(22) Filed: Jan. 13, 2000

(30) Foreign Application Priority Data

Mar. 31, 1999 (JP) ............................................ 11-091411

(51) Int. Cl.⁷ .............................................. B60K 41/02

(52) U.S. Cl. .............................. 701/56; 701/51; 701/55; 701/95; 477/62

(58) Field of Search ............................ 701/51, 54, 55, 701/56, 57, 95; 477/169, 62, 107, 110

(56) References Cited

U.S. PATENT DOCUMENTS 5,468,196 A * 11/1995 Minowa et al. ............... 477/62

* cited by examiner

Primary Examiner—William A. Cuchlinski, Jr.
Assistant Examiner—Arthur D. Donnelly
(74) Attorney, Agent, or Firm—Smith, Gambrell & Russell, LLP

(57) ABSTRACT

A control system of an automatic transmission for a vehicle comprises a first detecting means for detecting an accelerator pedal opening angle, a second detecting means for detecting a vehicle speed, a calculating means for calculating a required horsepower value by reference to a map parameterizing the accelerator pedal opening angle and the vehicle speed and a judging means for judging a gear shift of the automatic transmission by reference to a shift map parameterizing the required horsepower value and the vehicle speed. The shift map is prepared based on a plurality of full throttle horsepower curves obtained per each gear position in relation to the vehicle speed.

22 Claims, 16 Drawing Sheets

FIG. 6

| SELECTOR POSITION | | FRICTION DEVICES | | | | | | |
|---|---|---|---|---|---|---|---|---|
| | | REVERSE CLUTCH | 2&4 BRAKE | HIGH CLUTCH | LOW CLUTCH | LOW & REVERSE BRAKE | LOW ONE-WAY CLUTCH | LOCK-UP CLUTCH |
| P | | | | | | | | |
| R | | × | | | | × | | |
| N | | | | | | | | |
| D | 1st | | | | × | | × | |
| | 2nd | | × | | × | | | × |
| | 3rd | | × | × | × | | | × |
| | 4th | | × | × | | | | × |
| 3 | 1st | | | | × | | × | × |
| | 2nd | | × | | × | | | × |
| | 3rd | | | × | × | | | × |
| | 4th | | | | | | | |
| 2 | 1st | | | | × | | × | × |
| | 2nd | | × | | × | | | × |
| | 3rd | | | × | × | | | × |
| | 4th | | | | | | | |
| 1 | 1st | | | | × | × | | × |
| | 2nd | | × | | × | | | × |
| | 3rd | | | × | | | | × |
| | 4th | | × | × | | | | × |

INTEGRATED CONTROL SYSTEM FOR ENGINE AND AUTOMATIC TRANSMISSION

BACKGROUND OF THE INVENTION

1. Field of the Invention

The present invention relates to a control system for an automatic transmission, and more particularly, to a control system for integratedly controlling an engine and an automatic transmission.

2. Background Art

Since an electrically operated throttle valve is mechanically disconnected with an accelerator pedal, the relationship between the depression amount of the accelerator pedal and a throttle opening angle can be arbitrarily chosen. Therefore, the electrically operated throttle valve has the advantage of being able to choose a feel of operation of the accelerator pedal as a driver desires. The inventor of the present invention currently studies an integrated control system of an engine and automatic transmission using this electrically operated throttle valve.

SUMMARY OF THE INVENTION

It is an object of the present invention to provide an integrated control system for an engine and an automatic transmission capable of performing a shift control of the automatic transmission by properly estimating a driving force required by a driver.

The control system comprises a first detecting means for detecting an accelerator pedal opening angle, a second detecting means for detecting a vehicle speed, a third detecting means for detecting a speed of the engine, a first calculating means for calculating a required horsepower value based on the accelerator pedal opening angle and the vehicle speed, a second calculating means for calculating a required intake air amount per stroke based on the required horsepower value and the engine speed such that the engine outputs the required horsepower value, an engine control means for establishing a fuel injection amount of a fuel injector and a throttle opening angle of a throttle valve based on the required stroke intake air amount per stroke and a judging means for judging a gear shift of the automatic transmission based on the required horsepower value and the vehicle speed by reference to a shift judgment criteria. The shift judgment criteria comprises a plurality of full throttle horsepower curves obtained per each gear position when the accelerator pedal opening angle is maximum in relation to the vehicle speed and a plurality of zones corresponding to respective gear positions and enclosed by two neighboring full throttle horsepower curves.

BRIEF DESCRIPTION OF THE DRAWINGS

FIG. 6 is a diagram showing a relationship between gear positions and engagement conditions of friction devices;

DESCRIPTION OF PREFERRED EMBODIMENTS

Figure 1:
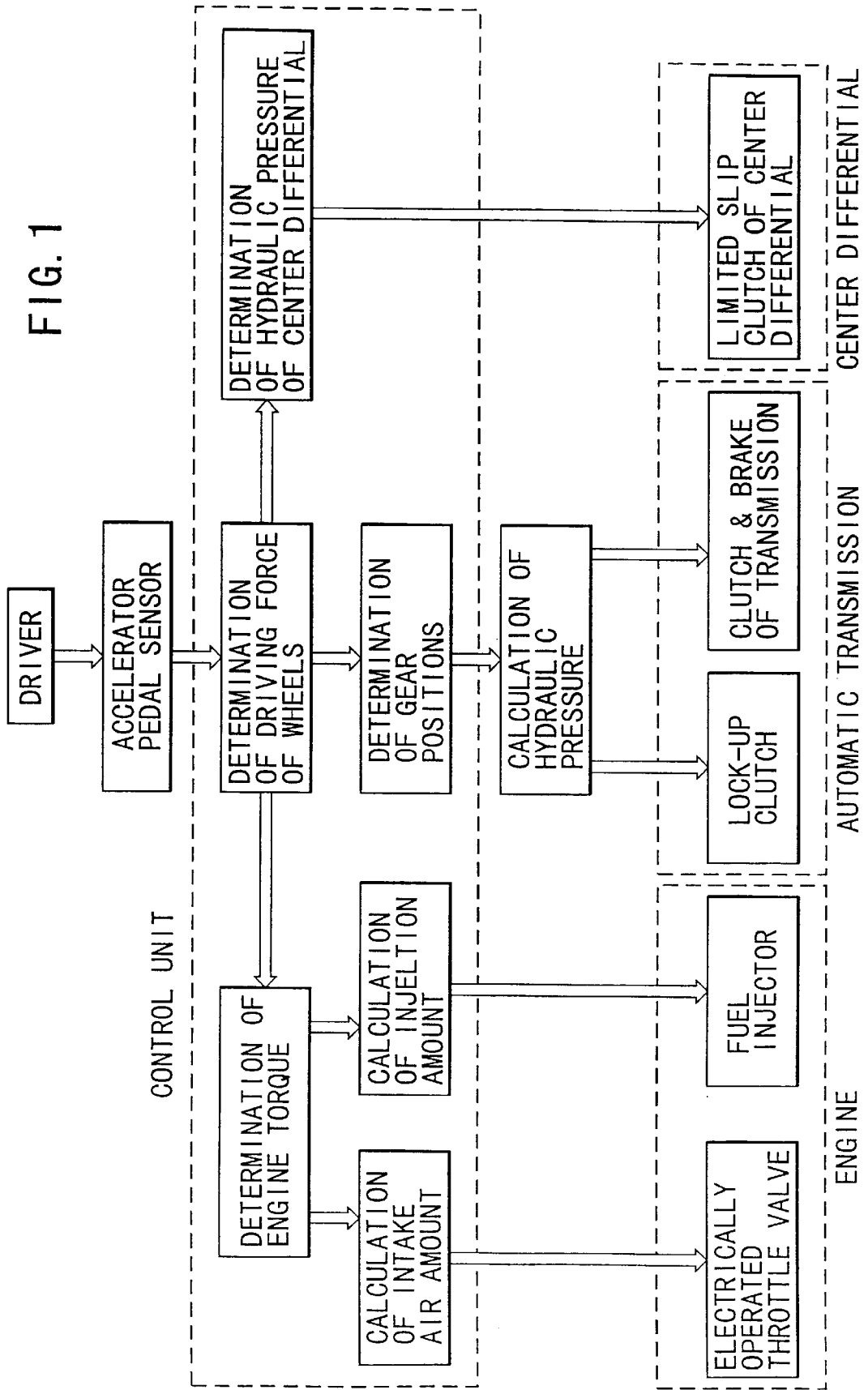
FIG. 1 is a schematic block diagram showing an integrated control system of an engine and automatic transmission.

FIG. 1 is a schematic block diagram showing an integrated control system of an engine and automatic transmission to which a shift control according to an embodiment of the present invention can be applied. According to the system, a degree of acceleration or deceleration required by a vehicle driver is judged in the form of the depression amount of an accelerator pedal, that is, an accelerator pedal opening angle and based on this a required driving force of wheels is determined. In shifting gears, regardless of up-shift or down-shift, an electrically operated throttle valve performs such an engine control as reducing torque or adjusting engine speeds.

Figure 2:
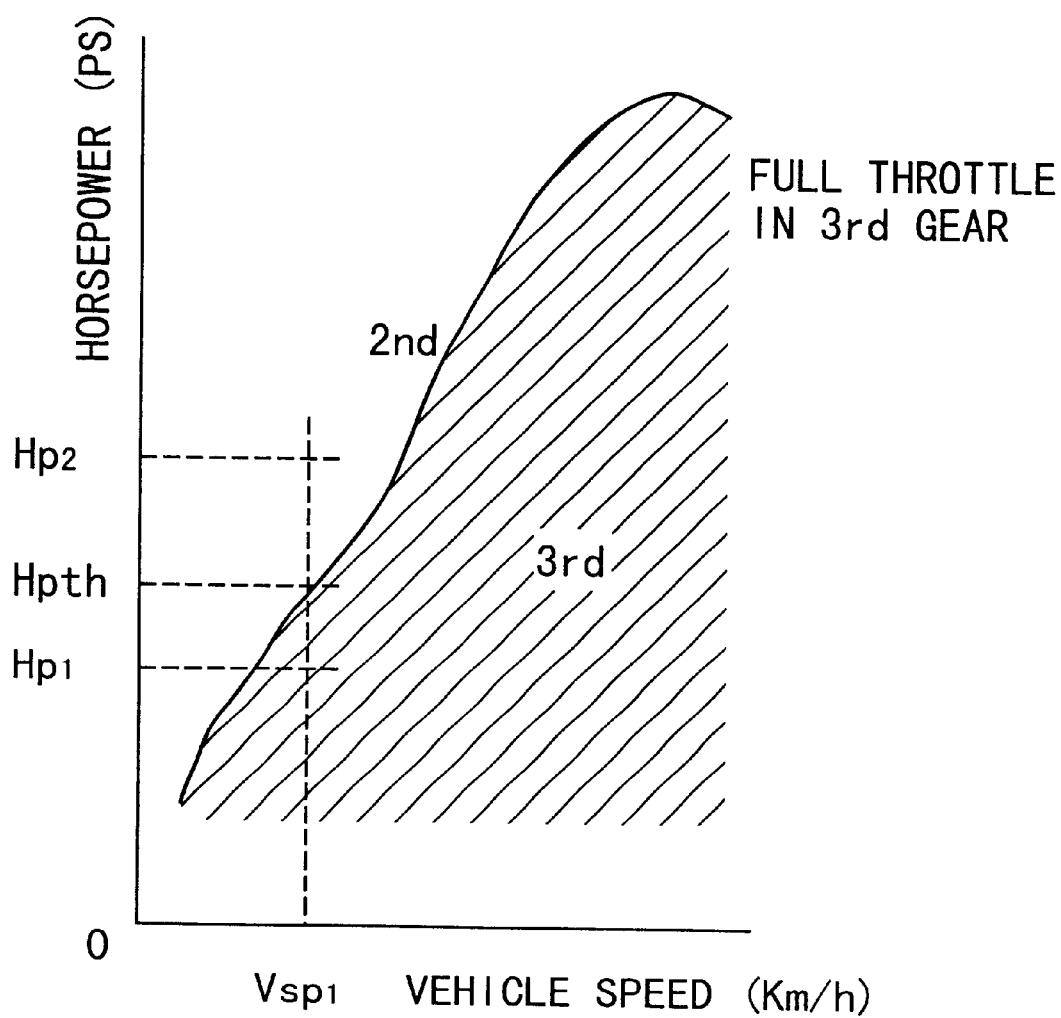
FIG. 2 is a graph of a full throttle power curve in 3rd gear.

Firstly, a shift control according to an embodiment will be described. In order to explain a shift judgment of the automatic transmission according to this embodiment, a full throttle horsepower curve in 3rd gear as shown in FIG. 2 is exemplified. This curve is obtained by measuring an engine horsepower with respect to a given vehicle speed with 3rd gear retained and by plotting thus obtained respective horsepowers in relation to vehicle speeds. Since this horsepower curve is obtained from a wide open throttle condition, a zone below the power curve (hatched zone) shows a power range which the engine can produce in 3rd gear by adjusting the accelerator pedal opening angle. In other words, a horse power exceeding this power curve can not be produced as far as the gear is retained in 3rd gear. For example, when the vehicle speed is $V_{sp1}$, a horse power $H_{P1}$ can be obtained by adjusting the accelerator opening angle but a horsepower $H_{p2}$ exceeding a reference horse power (full throttle horse power at $V_{sp1}$) $H_{pth}$ can not be obtained. To obtain the horsepower $H_{p2}$ at $V_{sp1}$, the gear must be changed from 3rd to 2nd. When a horsepower and a vehicle speed are given as input parameters, it can be judged from the full throttle horsepower curve whether or not a suitable gear ratio is selected. In the example shown in FIG. 2, if input parameters are $H_{p1}$ and $V_{sp1}$, the 3rd gear is acceptable, but in case of input parameters, $H_{p2}$ and $V_{sp1}$, the 3rd gear is unmanageable. In this case, the gear must be downshifted into 2nd. The same thing can be said when the gear is upshifted from 2nd to 3rd. That is, this full throttle horsepower curve can be used for judging an upshift or downshift between 2nd and 3rd gears. Further, in other words, the curve can be used for making a shift judgment parameterizing horsepowers and vehicle speeds.

Figure 3:
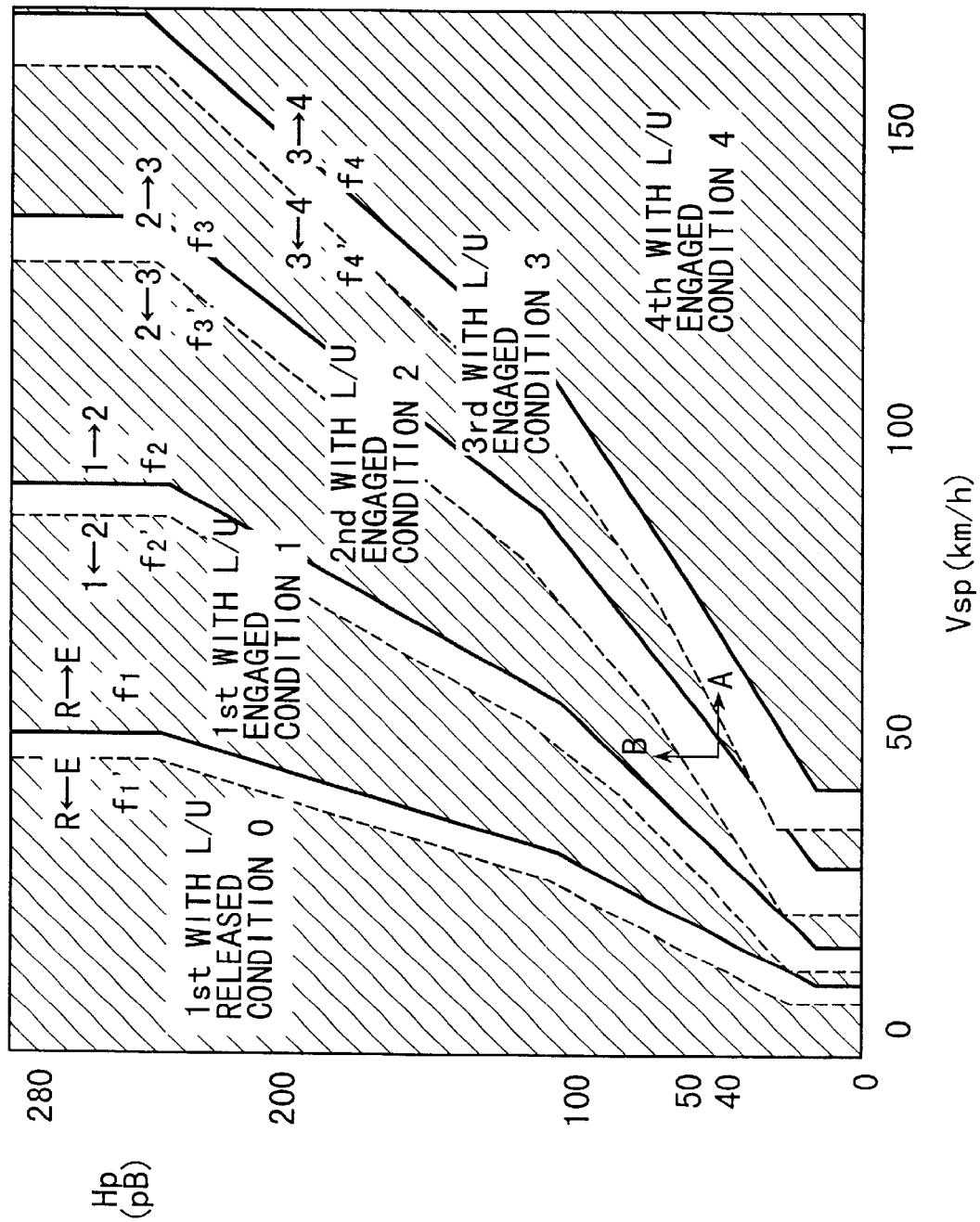
FIG. 3 is an example of a shift schedule on which a shift judgment is performed.

According to the same approaches as obtaining the full throttle horsepower curve in 3rd gear, by obtaining other full throttle horsepower curves at respective gear ratios, an overall shift judgment criteria can be prepared. FIG. 3 is a schematic diagram showing a shift map as an example of this criteria. The feature of the shift map is to use "a required horsepower value $H_p$" in place of the throttle opening angle which is generally used as an input parameter in shift maps of prior arts. The required horsepower value $H_p$ is an estimated value of acceleration required by a vehicle driver, which is calculated from an accelerator pedal opening angle $\theta_{acc}$ and a vehicle speed $V_{sp}$. The shift judgment of the automatic transmission is performed based on the required horsepower value $H_p$ and the vehicle $V_{sp}$ with reference to the shift map. If a gear position specified on the map differs from the prior gear position, the gear shift is carried out. As described hereinafter, the required horsepower value $H_p$ is used not only for the automatic transmission control but also for the engine control. In case of applying this value to the engine control, the engine produces a horsepower corresponding to the required horsepower value $H_p$.

The shift map shown in FIG. 3 is prepared as follows. First, a horsepower curve is measured under the condition of 1st gear and full throttle. Since an independent full throttle horsepower curve is determined per an engine characteristic, the horsepower $H_p$ is expressed as a function $H_p=F(V_{sp})$. Next, an inverse function $V_{sp}=f(H_p)$ is obtained. Then, limits within which the gear shift is permitted to be carried out are established on a maximum speed side (for example, 50 km/h in 1st gear) and on a minimum speed side (for example, 10 km/h in 1st gear), respectively. Thus obtained function is written on a map. The function is denoted as a 1st up function $f_1[V_{sp}=f_1(H_p)]$ with respect to 1st gear. In the same manner as obtaining the 1st up function $f_1$, a 2nd up function $f_2$, a 3rd up function $f_3$ and a 4th up function are obtained, respectively. The reason why the limit has been established on the maximum speed side, is to prevent an engine overrun after downshifting and the reason why the limit has been established on the minimum speed side, is that since the respective horsepower curves are close to each other, the very low speed zone should be treated as a dead zone.

Further, a 1st down function $f_1'$, a 2nd down function $f_2'$, a 3rd down function $f_3'$ and a 3rd down function $f_4'$ are obtained by slightly offsetting respective up functions $f_1$, $f_2$, $f_3$ and $f_4$ to above left in FIG. 3.

Next, respective zones enclosed by two neighboring up and down functions are corresponded to five shift conditions as shown. in the following Table 1:

TABLE 1

| Shift condition | Lock-up clutch | Zone on shift map |
| --- | --- | --- |
| Condition 0 | released in lst | left of $f_1$ ($f_1'$) |
| Condition 1 | engaged in lst | between $f_1$ ($f_1'$) and $f_2$ ($f_2'$) |
| Condition 2 | engaged in 2nd | between $f_2$ ($f_2'$) and $f_3$ ($f_3'$) |
| Condition 3 | engaged in 3rd | between $f_3$ ($f_3'$) and $f_4$ ($f_4'$) |
| Condition 4 | engaged in 4th | right of $f_4$ ($f_4'$) |

In this automatic transmission, in order to enhance both fuel economy and performance of the vehicle, a lock-up clutch is engaged from 1st gear after starting in 1st gear. with a torque converter operated. After that, all gears are shifted with a lock-up clutch engaged.

The gear shift is carried out when the shift condition has varied, that is, when the current zone of the shift map differs from the prior one. In judging the change of the shift condition, in case where the judgment is an up-shift (including the change from the condition 0 to the condition 1), up functions $f_1$, $f_2$, $f_3$ and $f_4$ are applied and in case where the judgment is a down-shift (including the change from the condition 1 to the condition 0), down functions $f_1'$, $f_2'$, $f_3'$ and $f_4'$ are applied. For example, in case where it is judged that the zone has transferred from the condition 2 to the condition 3, the 3 rd up function $f_3$ is applied and in case where it is judged that the zone has transferred from the condition 3 to the condition 2, the 3rd down function $f_3'$ is applied. Thus, by using slightly different functions between up-shift and down-shift, it is possible to prevent the shift condition from changing frequently.

Next, an integrated control of the engine and automatic transmission will be described.

Figure 4:
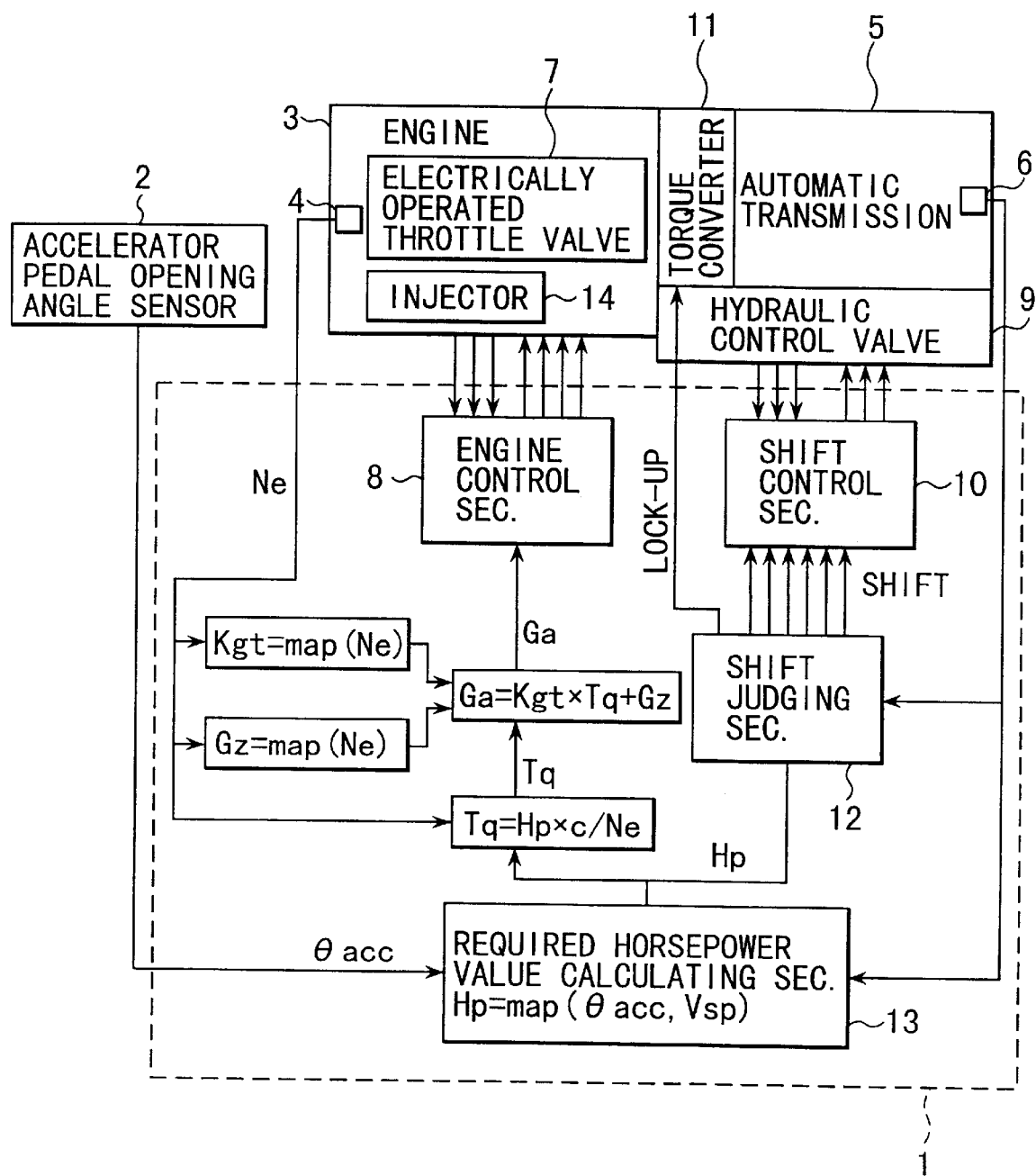
FIG. 4 is a block diagram showing an integrated control of an engine and automatic transmission.

Referring to FIG. 4, the control of the engine and automatic transmission is performed in a control section (ECU) 1. Information from miscellaneous sensors is inputted to the ECU 1. Among them, essential information in the integrated control is an accelerator pedal opening angle $\theta_{acc}$ obtained from an accelerator pedal opening angle sensor 2, an engine speed $N_e$ obtained from an engine speed sensor 4 provided in an engine 3 and a vehicle speed $V_{sp}$ obtained from a vehicle speed sensor 6 provided in an automatic transmission 5. The accelerator pedal opening angle sensor 2 is a sensor using a potentiometer, a gap sensor or the like for detecting the accelerator pedal angle $\theta_{acc}$, namely, a depression amount of an accelerator pedal.

Reference numeral 8 denotes an engine control section for controlling an engine output by controlling an electrically operated throttle valve 7 for regulating the intake air amount and a fuel injector 14 for injecting fuel. The throttle opening angle of the throttle valve 7 is not established mechanically via an accelerator cable interlocked with the accelerator pedal but established based on a required intake air amount per stroke $G_a$ calculated in the ECU 1. The required intake air amount per stroke $G_a$ is obtained based on a required horse power value $H_p$ calculated in a required horse power value calculating section 13. As described before, the required horse power value $H_p$ is an estimated value of an acceleration (including negative acceleration) required by a driver. Accordingly, the parameter $G_a$ introduced from the required horse power value $H_p$ corresponds to an air quantity needed for acceleration.

In this embodiment, an engine control section 8 performs an engine control generally called "fuel priority control". The fuel priority control is a method for concurrently establishing both a throttle opening angle needed for attaining the required intake air amount per stroke $G_a$ and a fuel injection amount needed for maintaining a target air fuel ratio according to the required intake air amount per stroke $G_a$. Further, the required intake air amount per stroke $G_a$ (hereinafter, referred to as "required intake air amount") $G_a$ is an intake air amount per one cylinder and per one stroke. Details of the fuel priority control are described in Japanese Patent Laid-open No. Toku-Kai-Hei 10-73037 proposed by the same applicant as the present invention.

What is important in this embodiment is to continue to output a horse power corresponding to the required horsepower value without changing the output of the engine 3 before and after shifting gears and the fuel priority control is one of approaches enabling this. The required intake air amount finally calculated includes a required air amount for idling, a required air amount for the cruise control besides the required intake air amount $G_a$ for acceleration.

Figure 5:
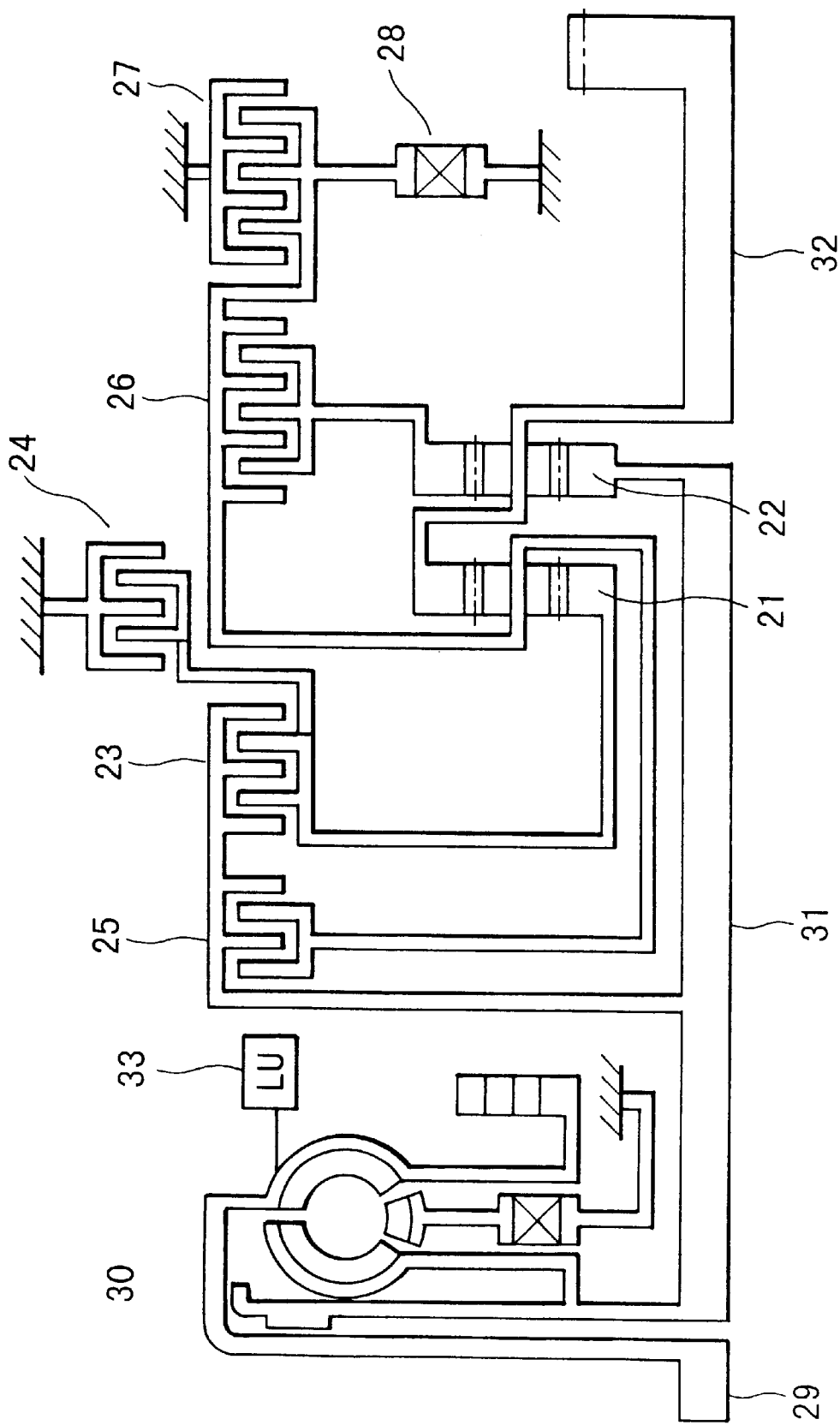
FIG. 5 is a schematic diagram showing a construction of an automatic transmission.

On the other hand, a shift control section 10 controls the engagement and release of friction devices such as clutches and brakes which constitute the automatic transmission 5. Referring now to FIG. 5, a driving force of a crankshaft 29 is transmitted to a turbine shaft 31 through a torque converter 30. The turbine shaft 31 is connected to a sun gear of a rear planetary gear set 22. A reduction drive shaft 32 is connected to a ring gear of a front planetary gear set 21 and a carrier of the rear planetary gear set 22. Respective members (sun gear, carrier and ring gear) of tow planetary gear sets 21, 22 are connected to three multiple disk clutches (reverse clutch 23, high clutch 25 and low clutch 26), two multiple disk brakes (2 & 4 brake 24 and low & reverse brake 27 ) and a low one-way clutch 28. The torque converter 30 has a lock-up clutch 33 for directly connecting the pump side with the turbine side. The lock-up clutch 33 of this embodiment is designed so as to be engaged in all shift conditions except the condition 0, as shown in FIG. 1.

FIG. 6 is a diagram showing a relationship between gear positions and engaged states of friction devices of the automatic transmission 5 having four forward speeds and one reverse speed. In this diagram, marks x indicate an engaged state of related friction devices, blank spaces indicate a released state, marks xx indicate an engaged state only when related friction devices are driven and marks xxx indicate a state of friction devices released when starting and engaged when exceeding a specified vehicle speed. When the gear shift or lock-up is required, a shift control section 10 (or a shift judging section 12 ) performs calculations which will be described hereinafter and outputs a shift requirement signal (or lock-up requirement signal) to a hydraulic control valve 9.

Figure 8:
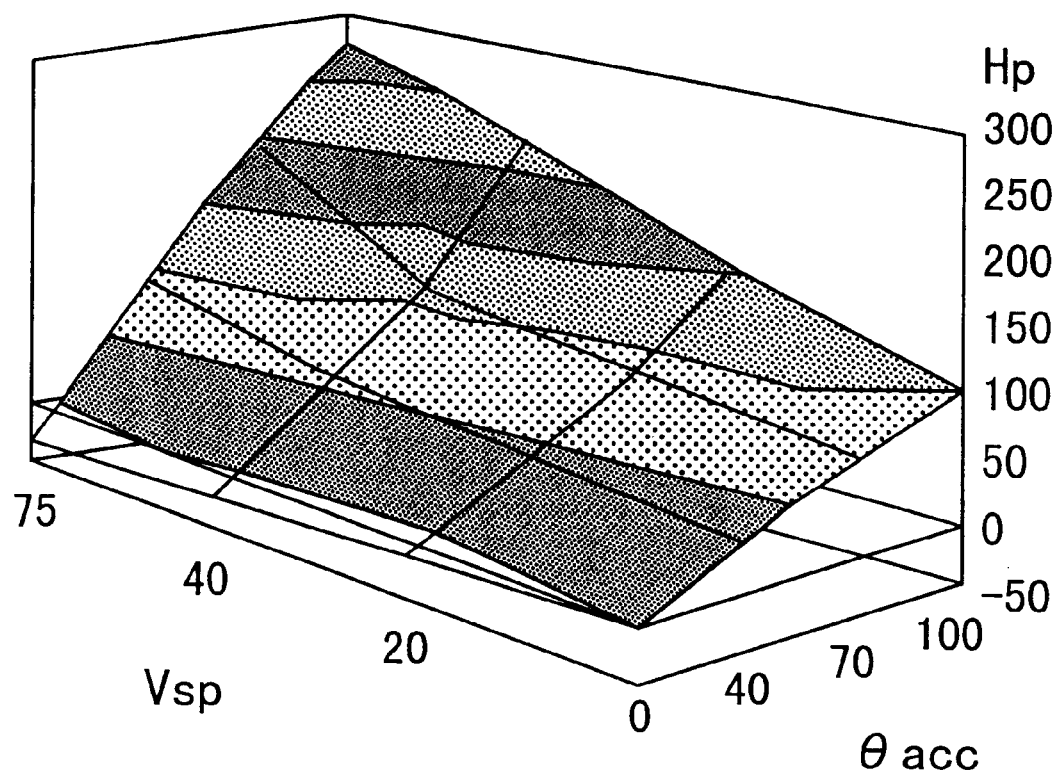
FIG. 8 is an explanatory view showing a calculation of a required horsepower value.

A required horsepower value calculating section 13 reads out a required horse power value $H_p$ from a three dimensional map parameterizing an accelerator pedal opening angle $\theta_{acc}$ and a vehicle speed $V_{sp}$, as shown in FIG. 8. The map is prepared such that the required horsepower value $H_p$ is determined from the intersection of the accelerator pedal opening angle $\theta_{acc}$ and the vehicle speed $V_{sp}$. In preparing the map, the required horsepower value $H_p$ is established at an optimal value through experiments and the like so as to agree with feel of acceleration actually experienced by a driver. In the following table 2, specific required horsepower values of an engine having a maximum horsepower 280 PS are exemplified.

TABLE 2

| $\theta_{acc}$ | 0% | 40% | 70% | 100% |
|---|---|---|---|---|
| $V_{sp}$ | | | | |
| 1 km/h | −1 | 39 | 70 | 100 |
| 20 km/h | −10 | 46 | 86 | 156 |
| 40 km/h | −15 | 54 | 114 | 224 |
| 75 km/h | −25 | 90 | 190 | 280 |

As understood from this table, a negative required horsepower value $H_p$ is established in the zone wherein the accelerator pedal opening angle $\theta_{acc}$ is small and the vehicle speed $V_{sp}$ is high. This negative horsepower $H_p$ is established to become larger as the vehicle speed $V_{sp}$ increases. This means that an engine brake is required in the high speeds and small opening angle condition.

This required horsepower value $H_p$ is a basic parameter in performing the engine and automatic transmission control. The accelerator pedal opening angle $\theta_{acc}$ is a parameter for calculating the required horsepower value $H_p$.

Further, the shift judging section 12 performs a shift judgment (including a lock-up judgment) with reference to the shift map parameterizing the required horsepower value $H_p$ and the vehicle speed $V_{sp}$, as shown in FIG. 3. If it is judged that the current shift condition has changed, the shift judging section outputs a shift requirement signal (either of 1st to 2nd, 2nd to 3rd, 3rd to 4th, 4th to 3rd, 3rd to 2nd, 2nd to 1st) or a lock-up requirement signal (either of engagement and disengagement of the lock-up clutch 33) so as to establish a new shift condition.

Figure 7:
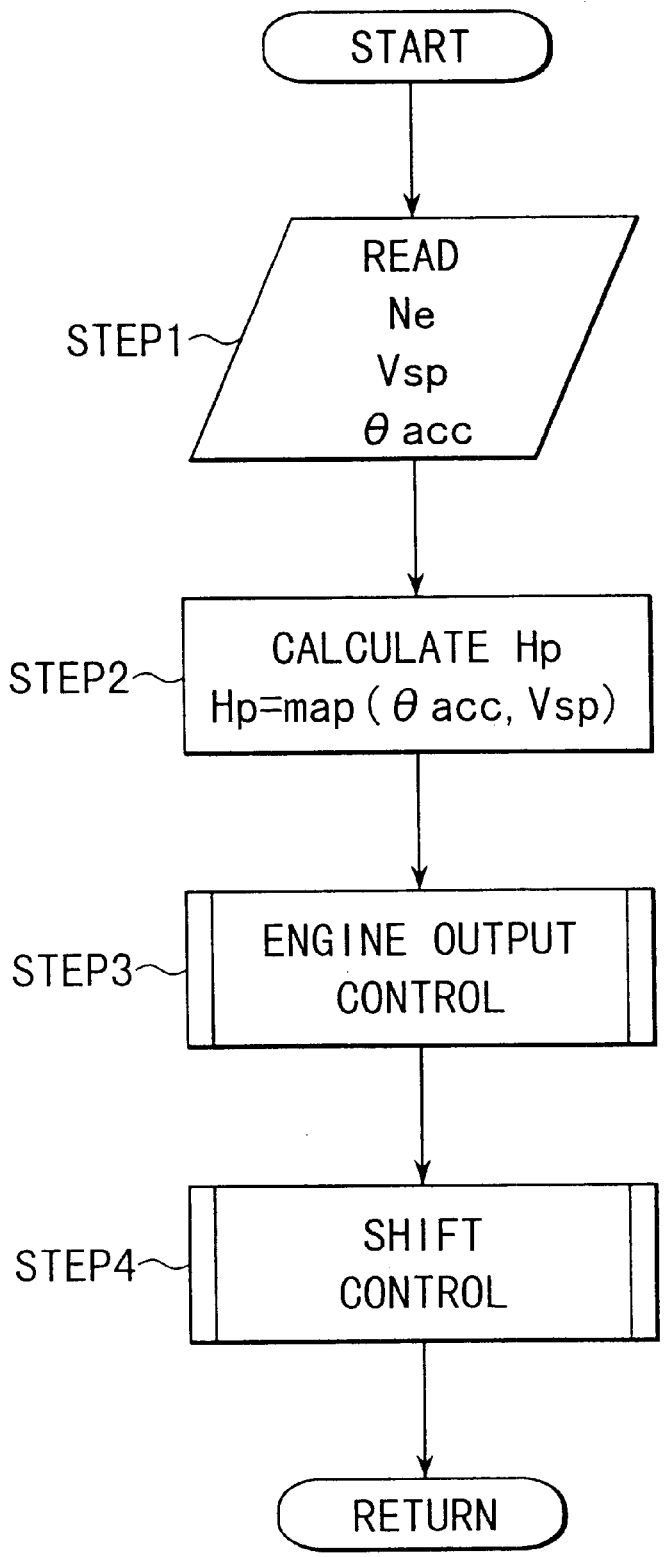
FIG. 7 is a flowchart showing control processes of an engine and automatic transmission.

FIG. 7 is a flowchart showing control processes of an engine and automatic transmission. The program according to this flowchart is carried out repeatedly at a specified time interval (for example 10 milliseconds). First, at a step 1, required parameters such as engine speed $N_e$, vehicle speed $V_{sp}$, accelerator pedal opening angle $\theta_{acc}$ and the like are read from the sensor signals of miscellaneous sensors.

Next, at a step 2, the required horsepower value calculating section 13 calculates a required horsepower value $H_p$ with reference to the required horsepower value calculating map as shown in FIG. 8. When an accelerator pedal opening angle $\theta_{acc}$ and a vehicle speed $V_{sp}$ are given, a corresponding required horsepower value $H_p$ is uniquely determined. Thus obtained required horsepower value $H_p$ is employed for the engine control (step 3) and for the automatic transmission control (step 4), respectively.

Figure 9:
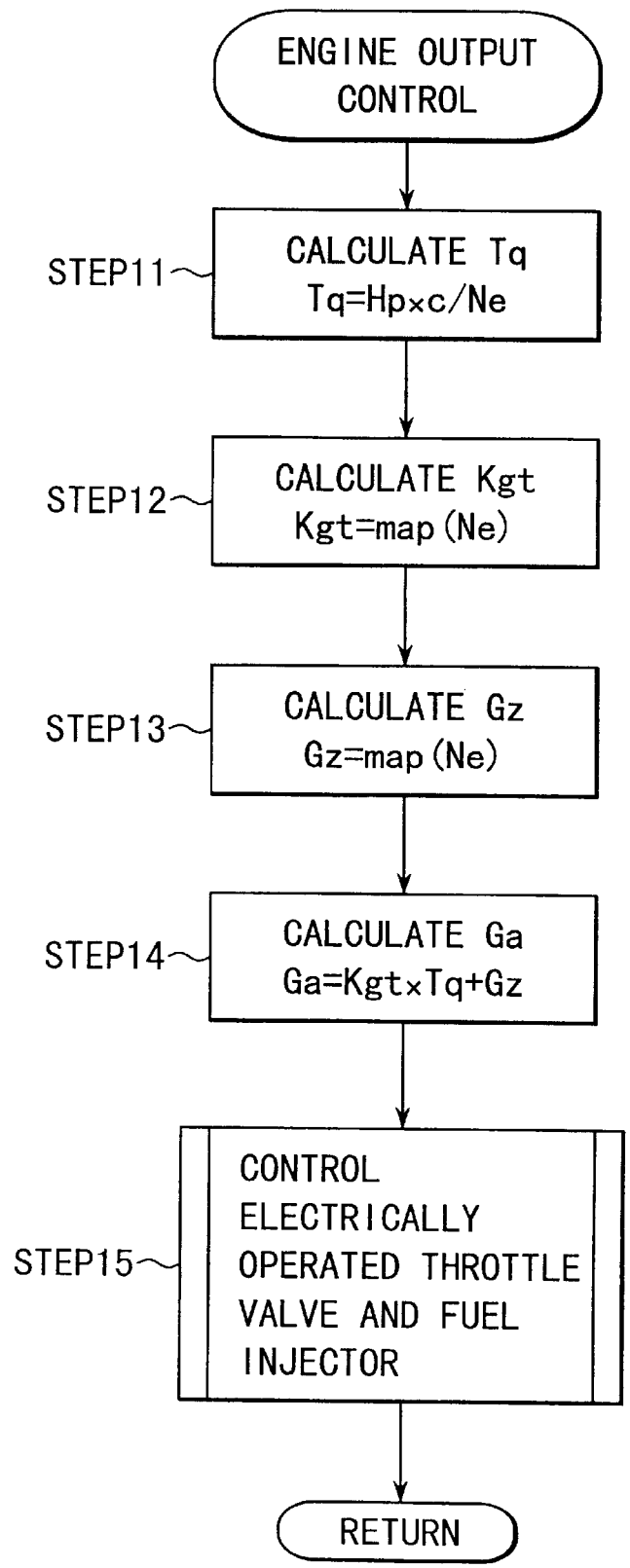
FIG. 9 is a flowchart showing processes of an engine control of FIG. 7.

FIG. 9 is a flowchart showing processes of the engine control (step 3) of FIG. 7. First, at a step 11, a required torque value $T_q$ of the engine is calculated by substituting the required horsepower value $H_p$ calculated in the step 2 and the engine speed $N_e$ read in the step 1 into the following formula.

$$T_q = H_p \times c / N_e \quad (1)$$

where c is a constant.

Next, a required stroke intake air amount $G_a$ which is needed for the generation of the required torque value $T_q$ is calculated according to the following formula.

$$G_a = K_{gt} \times T_q + G_z \quad (2)$$

where $K_{gt}$ is a coefficient and $G_z$ is an initial value or a stroke intake air amount when the actual engine torque is zero.

Figure 10:
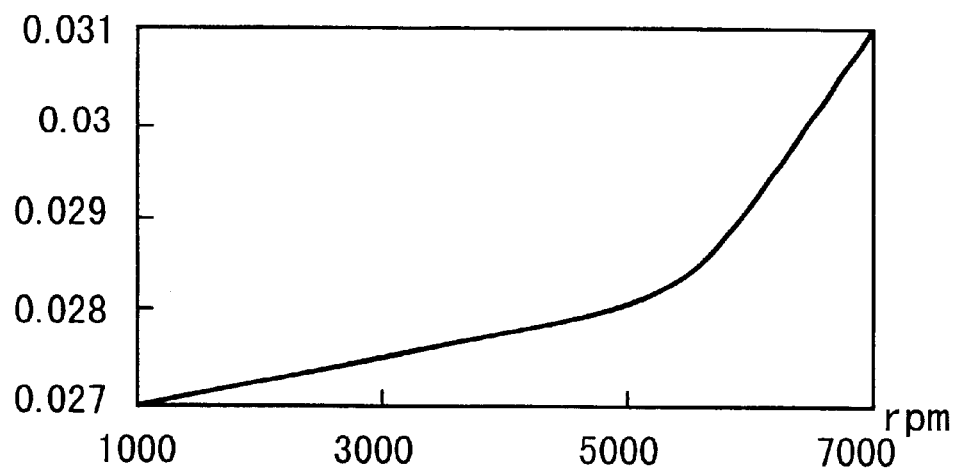
FIG. 10 is an example of a map for obtaining a coefficient from engine speeds.
Figure 11:
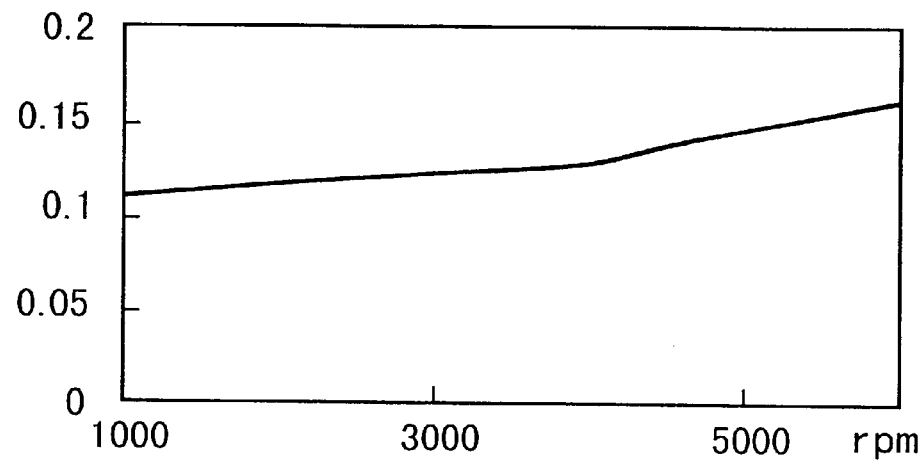
FIG. 11 is an example of a map for obtaining an initial value from engine speeds.

The coefficient $K_{gt}$ is calculated at a step 12 from a map exemplified in FIG. 10 and the initial value $G_z$ is obtained at a step 13 from a map exemplified in FIG. 11. Specific values of these $K_{gt}$ and $G_z$ are obtained by applying the least square method to values empirically determined with respect to engine speeds beforehand.

Further, at a step 14, the required stroke intake air amount $G_a$ is calculated by substituting these parameters $T_q$, $K_{gt}$ and $G_z$ into the formula 2. Based on this required stroke intake air amount $G_a$, at a step 15, a throttle opening angle of the electrically operated throttle valve 7 and an injection amount of the fuel injector 14 are established.

Thus, the engine can produce a horsepower corresponding to the required horsepower value $H_p$. Under this engine control, even if the gear shift is performed, the output of the engine does not change. As an alternative method of calculating the required stroke intake air amount $G_a$, it is also possible to use a map directly specifying the relationship between the required torque value $T_q$ and the required stroke intake air amount $G_a$.

Figure 12:
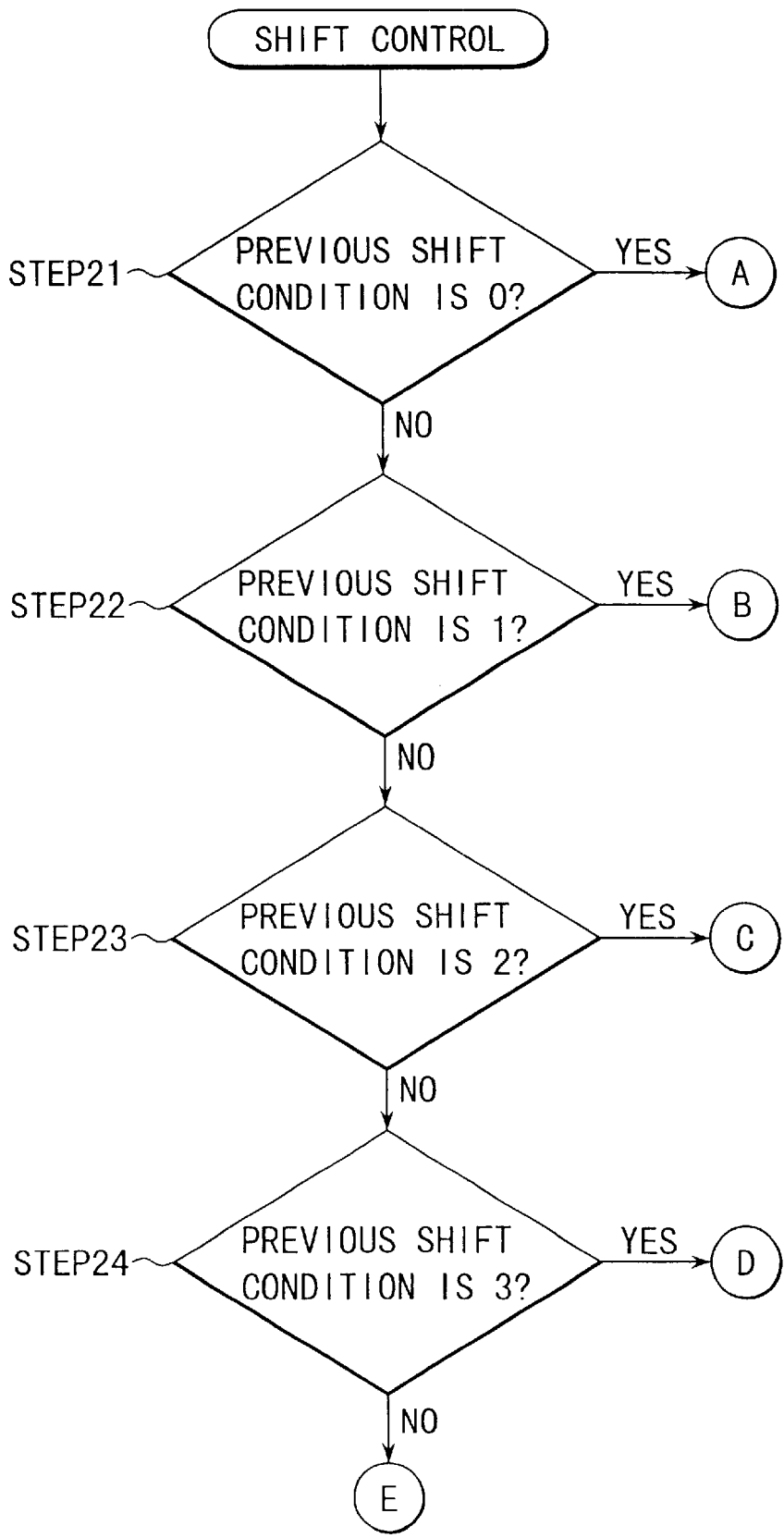
FIG. 12 is a flowchart showing processes of a transmission control of FIG. 7.
Figure 13:
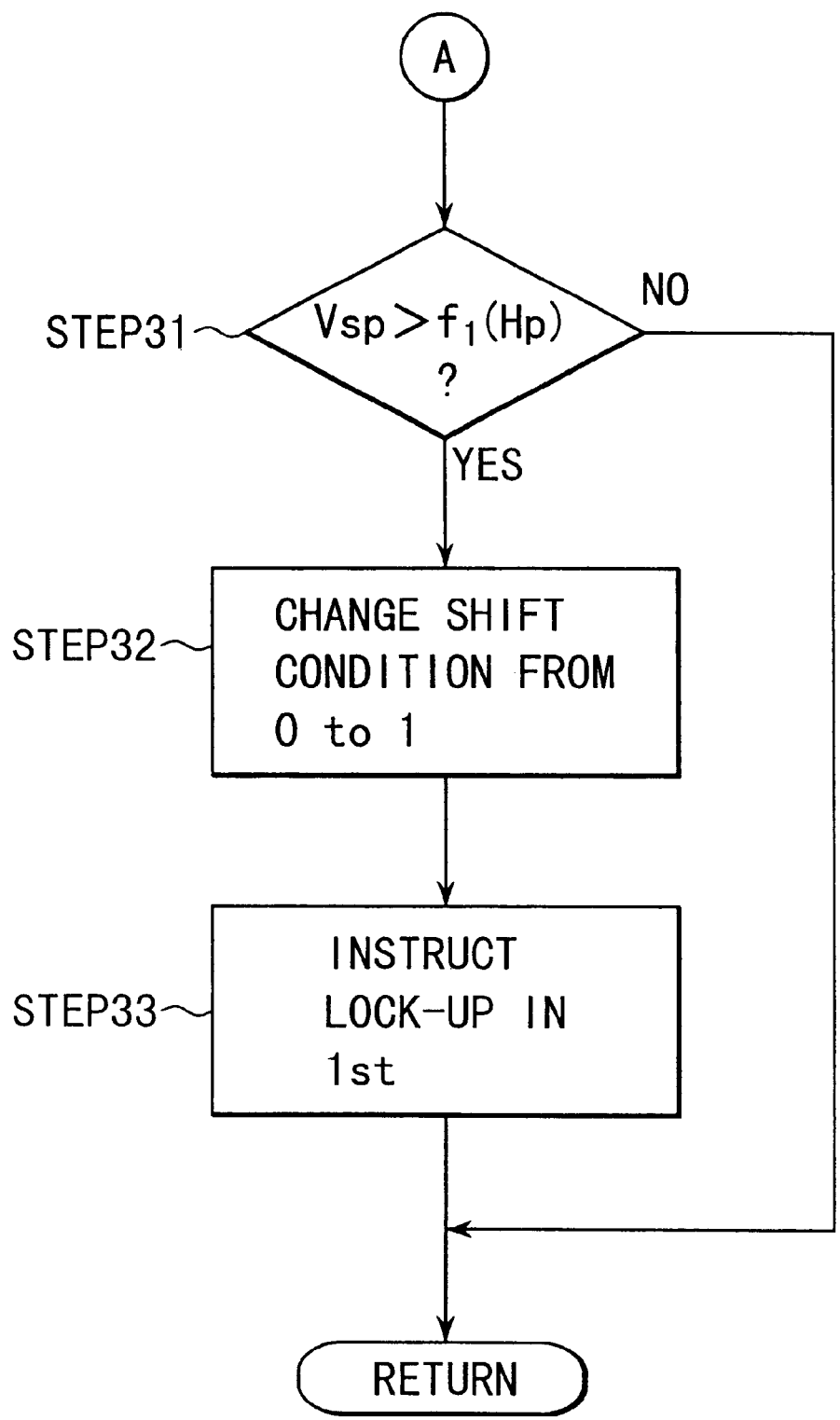
FIG. 13 is a flowchart showing processes at a condition "0" in FIG. 12.

FIG. 12 is a flowchart showing processes of a shift control (step 4). Referring to a shift map exemplified in FIG. 3, first, at a step 21, in case where it is judged that the shift condition is "condition 0", that is, "1st with lock-up released", the program goes to a step 31 of FIG. 13. At the step 31, it is judged whether or not the current vehicle speed $V_{sp}$ is larger than a 1st up reference value $f_1(H_p)$. The 1st up reference value is a vehicle speed corresponding to a given required horsepower value $H_p$, that is, a threshold value for judging the gear shift (in this example, a gear shift into "1st with L/U engaged"). If the vehicle speed $V_{sp}$ is smaller than the reference value $f_1(H_p)$, since the current vehicle speed $V_{sp}$ is a vehicle speed at which the required horsepower value $H_p$ can be produced in "1st with L/U released" (condition 0), it is not necessary to change the shift condition of the automatic transmission 5. Accordingly, the program goes to RETURN and then returns to the program shown in FIG. 7.

On the other hand, if it is judged that the current vehicle speed $V_{sp}$ is larger than the reference value $f_1(H_p)$, since the vehicle speed $V_{sp}$ has reached a vehicle speed at which the required horsepower value $H_p$ can be produced in "1st with L/U engaged" (condition 1), at a step 32, the shift condition of the automatic transmission 5 is changed from "condition 0" to "condition 1". Then, at a step 33, the shift control section 12 outputs a signal for instructing a lock-up in 1st gear to the hydraulic control valve 9 and the program goes to RETURN. Thus, the lock-up clutch 33 is engaged.

Figure 14:
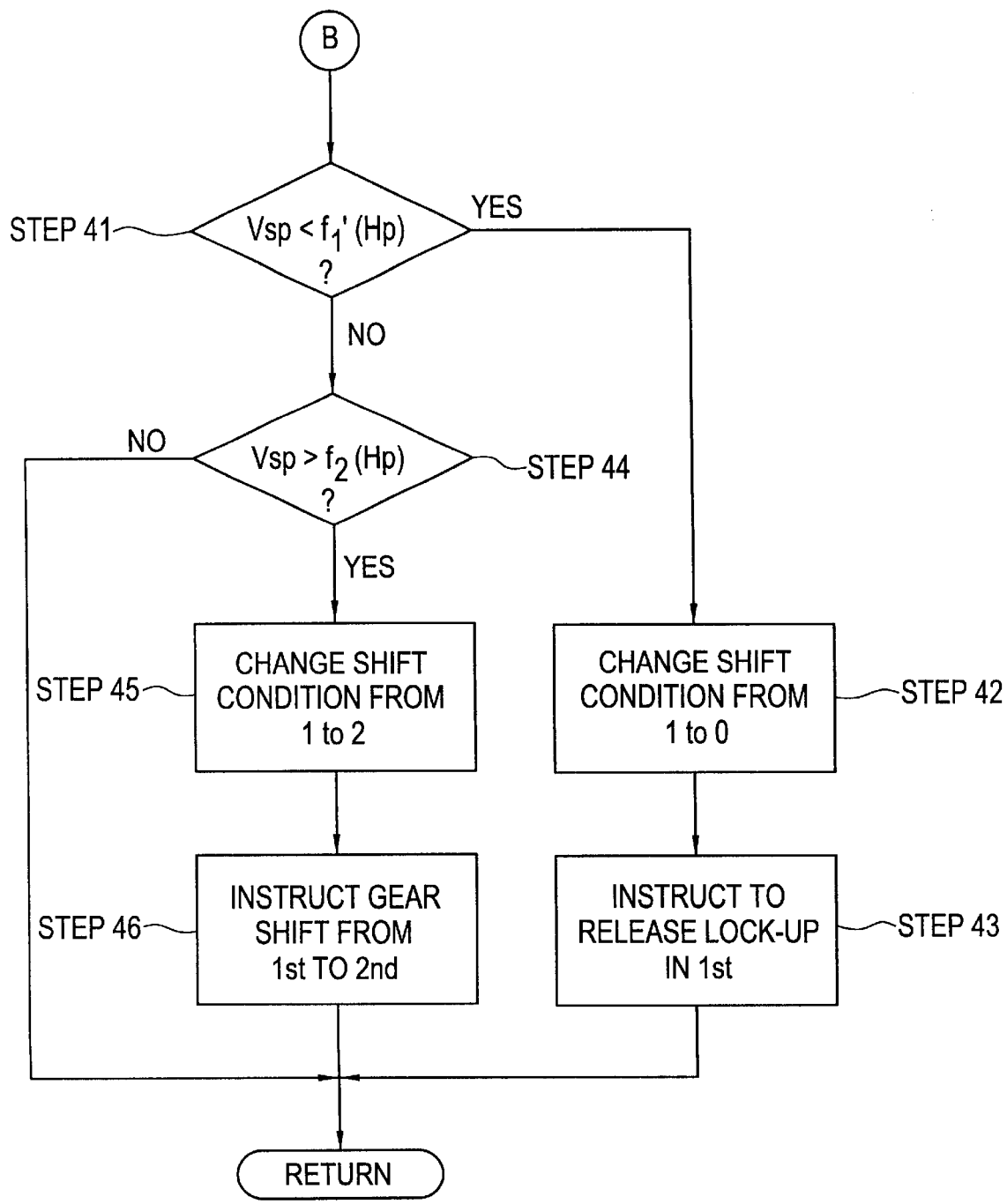
FIG. 14 is a flowchart showing processes at a condition "1" in FIG. 12.

At a step 22, in case where the previous shift condition is "condition 1", that is, "1st with L/U engaged", the program goes to a step 41 of FIG. 14, where it is judged whether or not the current vehicle speed $V_{sp}$ is smaller than a 1st down reference value $f_1'(H_p)$. If the vehicle speed $V_{sp}$ is smaller than the reference value $f_1'(H_p)$, the gear must be shifted down in order to establish an engine speed $N_e$ for producing the required horsepower value $H_p$ at the vehicle speed $V_{sp}$. Accordingly, at a step 42, the shift judging section 12 changes the shift condition of the automatic transmission 5 from "condition 1" to "condition 0", then, at a step 43, instructs to release a lock-up in 1st gear and the program goes to RETURN.

On the other hand, in case where it is judged at the step 41 that the vehicle speed $V_{sp}$ is larger than the reference value $f_1'(H_p)$, it is further judged at a step 44 whether or not the vehicle speed $V_{sp}$ is larger than a 2nd up reference value $f_2(H_p)$ If the condition of the step 44 is satisfied, since the vehicle speed (engine speed) reaches a vehicle speed at which the required horsepower value $H_p$ can be outputted in 2nd gear with L/U engaged, at a step 45, the shift condition is changed from "condition 1" to "condition 2" and at the same time, at a step 46, the gear is shifted up into 2nd gear. If the condition of the step 44 is not satisfied, since it is not necessary to shift gears, the program goes to RETURN.

Figure 15:
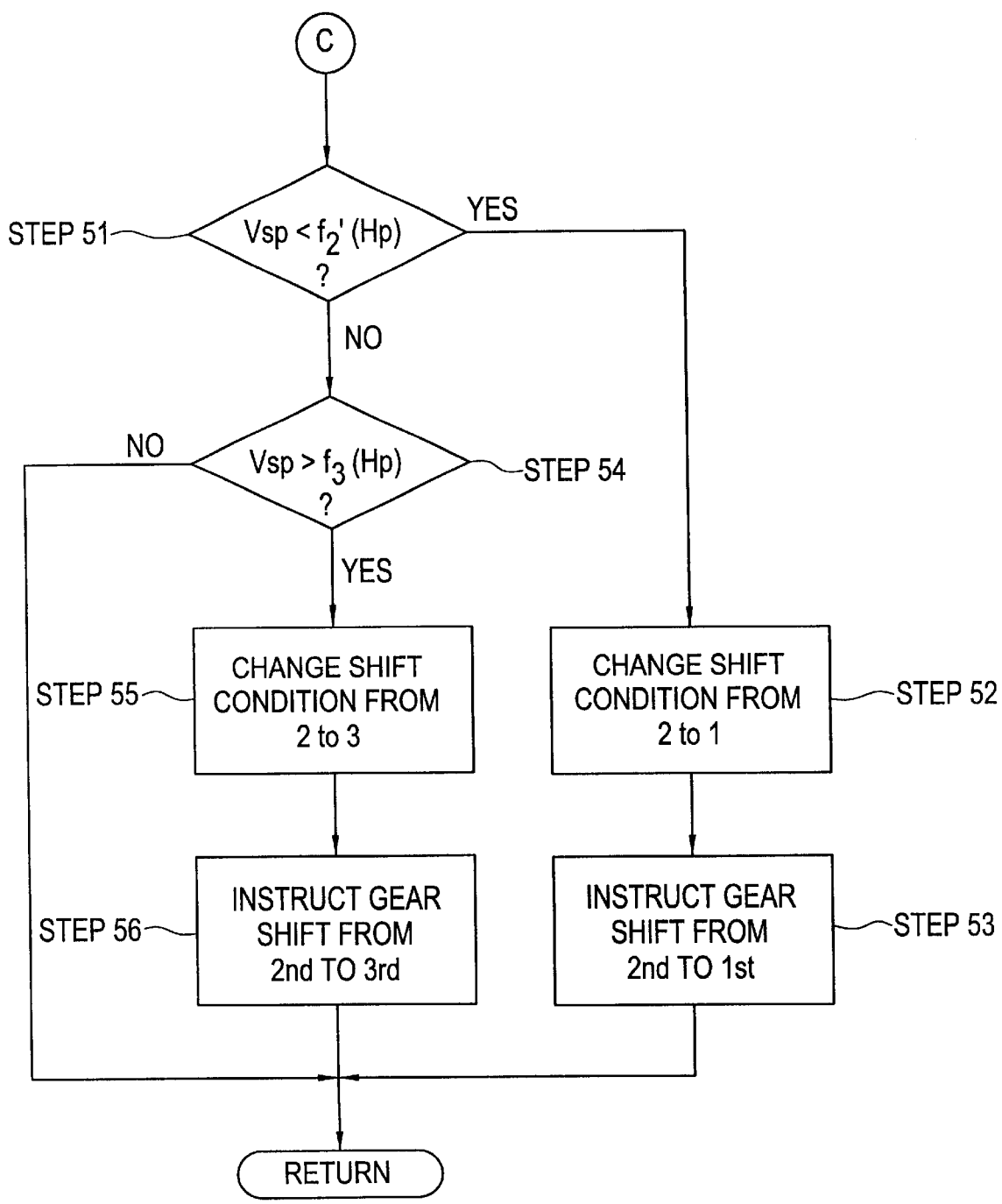
FIG. 15 is a flowchart showing processes at a condition "2" in FIG. 12.

At a step 23 of FIG. 12, in case where it is judged that the previous shift condition is "condition 2", that is, "2nd with L/U engaged", the program goes to a step 51 of FIG. 15, in which it is judged whether or not the current vehicle speed $V_{sp}$ is smaller than a 2nd down reference value $f_2'(H_p)$. If this condition is satisfied, at a step 52 the shift condition is changed from "condition 2" to "condition 1" and at a step 53 a down-shift into 1st gear is instructed. If the condition of the step 51 is not satisfied, it is further judged at a step 54 whether or not the vehicle speed $V_{sp}$ is larger than a 3rd up reference value $f_3(H_p)$ Further, if this condition is satisfied, at a step 55 the shift condition is changed from "condition 2" to "condition 3" and at the same time, at a step 56 an up-shift into 3rd gear is instructed.

Figure 16:
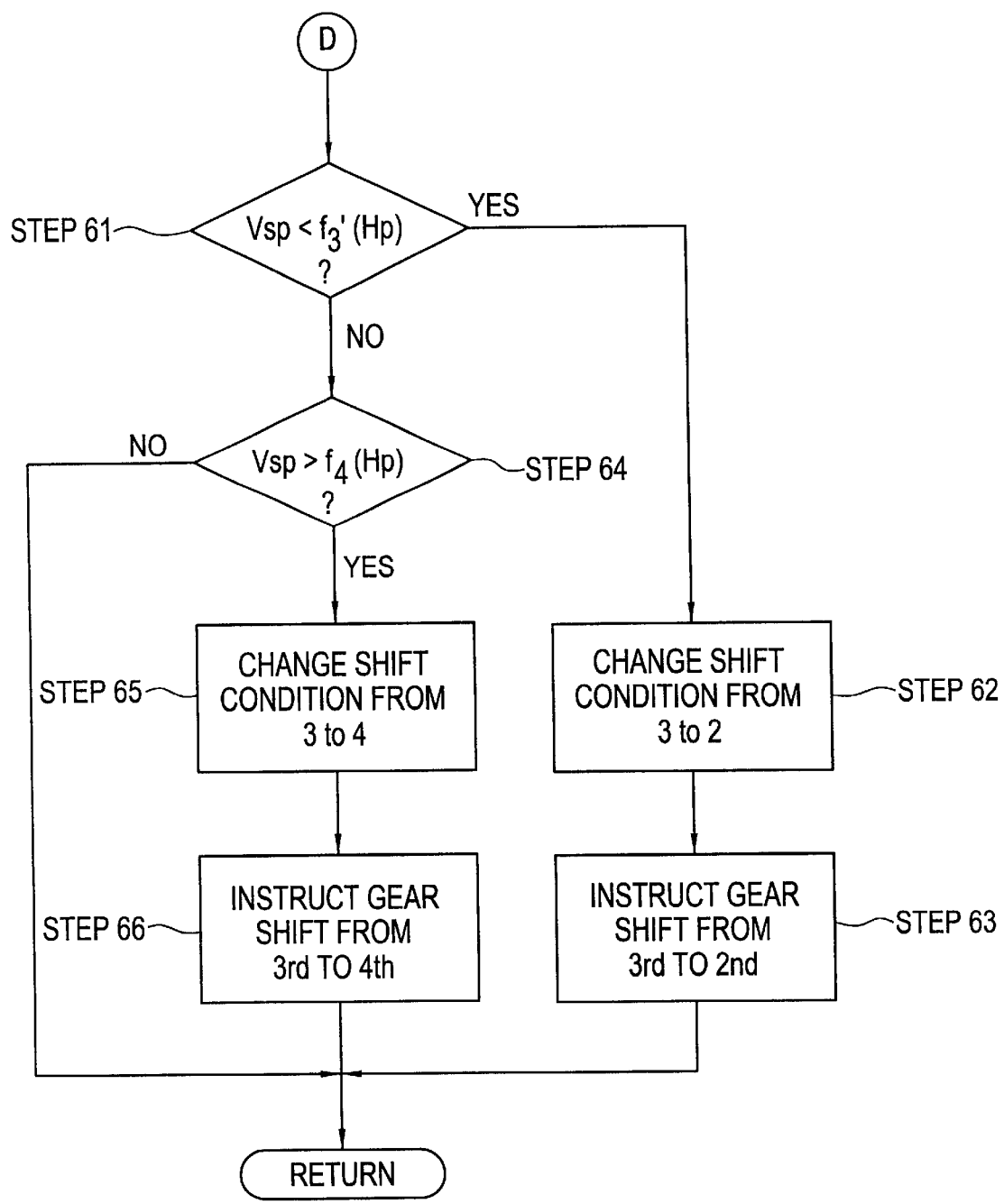
FIG. 16 is a flowchart showing processes at a condition "3" in FIG. 12.

Further, at a step 24 of FIG. 12, in case where it is judged that the previous shift condition is "condition 3", that is, "3rd with L/U engaged", the program goes to a step 61 of FIG. 16, in which it is judged whether or not the current vehicle speed $V_{sp}$ is smaller than a 3rd down reference value $f_3'(H_p)$. If this condition is satisfied, at a step 62 the shift condition is changed from "condition 3" to "condition 2" and at a step 63 a down-shift into 2nd gear is instructed. If the condition of the step 61 is not satisfied, it is further judged at a step 64 whether or not the vehicle speed $V_{sp}$ is larger than a 4th up reference value $f_4(H_p)$. If this condition is satisfied, at a step 65 the shift condition is changed from "condition 3" to "condition 4" and at a step 66 an up-shift into 4th gear is instructed.

Figure 17:
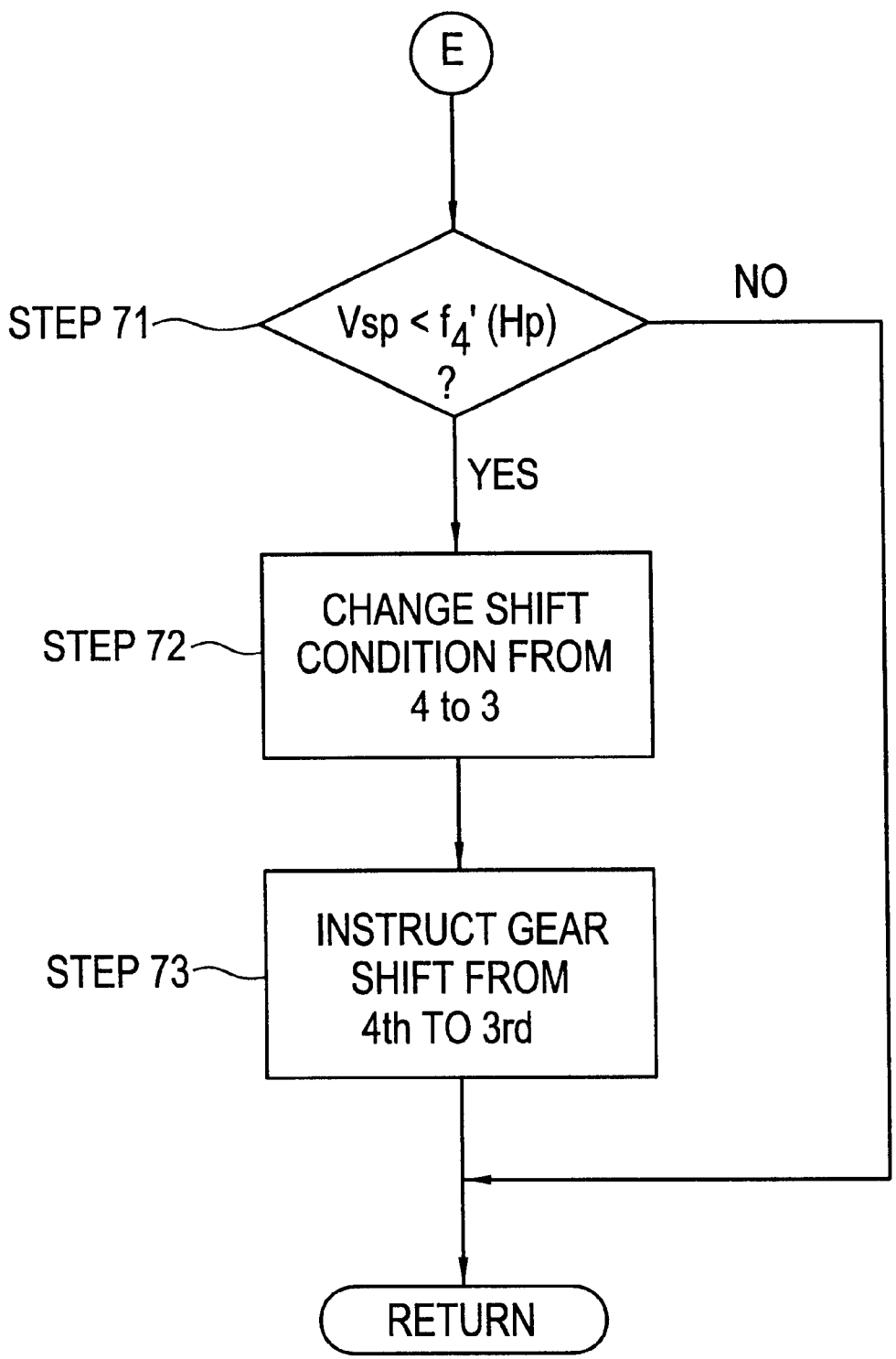
FIG. 17 is a flowchart showing processes at a condition "4" in FIG. 12.

Finally, at a step 24 of FIG. 12, in case where it is judged that the previous shift condition is "condition 4" (4th with L/U engaged), the program goes to a step 71 of FIG. 17, in which it is judged whether or not the current vehicle speed $V_{sp}$ is smaller than a 4th down reference value $f_4'(H_p)$. If this condition is satisfied, at a step 72 the shift condition of the automatic transmission 5 is changed from "condition 4" to "condition 3" and at a step 73 a down-shift into 3rd gear is instructed. Further, if the condition of the step 71 is not satisfied, the program goes to RETURN without instructing the down-shift.

As described above, the control system according to the present invention enables to secure a running performance reflecting an acceleration intended by a driver by controlling both the engine 3 and the automatic transmission 5 based on the required horsepower value $H_p$ and the vehicle speed $V_{sp}$. To understand this more deeply, following two cases will be exemplified.

Firstly, considering a case of a vehicle accelerating from a vehicle speed slightly lower than 50 km/h with a required horsepower value of 40 PS (direction A in FIG. 3), the engine is outputting 40 ps according to the engine control described before and the automatic transmission is set in 2nd gear. When the vehicle speed $V_{sp}$ exceeds 50 km/h, the vehicle passes the 3rd up curve $f_3$ and the transmission has an up-shift into 3rd gear. Even after the up-shift into 3rd gear, the engine output is maintained at 40 PS, although the engine speed changes largely. Accordingly, assuming that the gear efficiency of the automatic transmission is almost constant, there occurs no substantial change in the acceleration of the vehicle before and after the up-shift. Further, there is also no change in the depression amount of the accelerator pedal before and after the up-shift. That is, in the control system of the present invention, since there occurs no change in acceleration before and after the up-shift, a driver can secure a feel of acceleration according to the driver's desire without feeling discomfort caused by the change of acceleration.

On the other hand, according to the prior art, since the shift control is performed using a shift map parameterizing the throttle opening angle and the vehicle speed, if the depression amount of the accelerator pedal is constant, the acceleration is reduced by the up-shift. As a result, the driver feels uncomfortable because of an unexpected deceleration. In order to secure the same acceleration as before the up-shift, the driver must depress the accelerator pedal furthermore and in some cases, a down-shift may occurs unexpectedly. To prevent such down-shift, it is necessary to prepare a more fine, sophisticated and time-consuming shift map. These problems can be solved by performing the shift judgment based on input parameters of the required horsepower value and the vehicle speed.

Secondly, considering a case where a driver depresses the accelerator pedal to accelerate the vehicle slightly while the vehicle is traveling on an upgrade in 3rd gear with a required horsepower value 40 PS (direction B in FIG. 3), the engine continues to increase an output according to the engine control. When the required horsepower value exceeds 50 PS, the vehicle passes the 3rd down curve f3' and as a result the transmission has a down-shift into 2nd gear. However, the acceleration does not change largely before and after the down-shift. Therefore, such a sudden increase of acceleration as experienced in the prior art does not occur. Further, it is not necessary to release and then depress the accelerator pedal again. Accordingly, the driver can secure a running according to his or her desire for the same reason as in the first case.

In summary, according to the present invention, an acceleration required by a driver is estimated based on an accelerator pedal opening angle and a vehicle speed, the estimated acceleration is substituted into a required horsepower value, and a shift judgment of the automatic transmission is performed based on the required horsepower value. Since the gear shift is performed according to this shift judgment, a driver can maintain the same acceleration as the one before the gear shift. Accordingly, the driver can secure a running characteristic faithful to his or her desire.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A control system of an automatic transmission for a vehicle, comprising:

first detecting means for detecting an accelerator pedal opening angle;

second detecting means for detecting a vehicle speed;

calculating means for calculating a required horsepower value based on said accelerator pedal opening angle and said vehicle speed;

reference value calculating means for calculating a reference value for gear shifting corresponding to said required horsepower by reference to a shift map parameterizing vehicle speed and horsepower; and judging means for judging a gear shift of said automatic transmission by comparing said vehicle speed with said reference value.

2. A control system of an automatic transmission for a vehicle, comprising:

first detecting means for detecting an accelerator pedal opening angle;

second detecting means for detecting a vehicle speed;

calculating means for calculating a required horsepower value based on said accelerator pedal opening angle and said vehicle speed by reference to required horsepower value calculating criteria; and judging means for judging a gear shift of said automatic transmission based on said required horsepower value and said vehicle speed by reference to shift judgment criteria.

3. The control system according to claim 2, wherein said required horsepower value calculating criteria is for obtaining said required horsepower value in relation to said accelerator pedal opening angle and said vehicle speed.

4. The control system according to claim 2, wherein said required horsepower value calculating criteria includes a negative required horsepower value in an area where said accelerator pedal opening angle is small and said vehicle speed is high.

5. The control system according to claim 2, wherein said shift judgment criteria comprises a plurality of full throttle horsepower curves obtained when said accelerator pedal opening angle is maximum per each gear position in relation to said vehicle speed and a plurality of zones enclosed by two neighboring full throttle horsepower curves and said respective zones correspond to respective gear positions.

6. The control system according to claim 2, wherein said shift judgment criteria establishes a limit of a maximum vehicle speed below which said gear shift is permitted for each gear position.

7. The control system according to claim 2, wherein said shift judgment criteria establishes a limit of a minimum vehicle speed above which said gear shift is permitted for each gear position.

8. The control system according to claim 2, wherein said gear shift is performed when a current zone of said shift judgment criteria differs from a prior zone.

9. A control system of a vehicle for integrally controlling an automatic transmission and an engine having a fuel injector and a throttle valve, comprising:

first detecting means for detecting an accelerator pedal opening angle;

second detecting means for detecting a vehicle speed;

third detecting means for detecting a speed of said engine;

first calculating means for calculating a required horsepower value based on said accelerator pedal opening angle and said vehicle speed by reference to required horsepower value calculating criteria;

second calculating means for calculating a required stroke intake air amount based on said required horsepower value and said engine speed such that said engine outputs said required horsepower value;

engine control means for establishing a fuel injection amount of said fuel injector and a throttle opening angle of said throttle valve based on said required stroke intake air amount; and judging means for judging a gear shift of said automatic transmission based on said required horsepower value and said vehicle speed by reference to shift judgment criteria.

10. The control system according to claim 9, wherein said required horsepower value calculating criteria is for obtaining said required horsepower value in relation to said accelerator pedal opening angle and said vehicle speed.

11. The control system according to claim 10, wherein said required horsepower value calculating criteria includes a negative required horsepower value in an area where said accelerator pedal opening angle is small and said vehicle speed is high.

12. The control system according to claim 9, wherein said shift judgment criteria comprises a plurality of full throttle horsepower curves obtained per each gear position when said accelerator pedal opening angle is maximum in relation to said vehicle speed and a plurality of zones corresponding to respective gear positions and enclosed by said two neighboring full throttle horsepower curves.

13. The control system according to claim 9, wherein said shift judgment criteria includes a limit of a maximum vehicle speed below which said gear shift is permitted.

14. The control system according to claim 9, wherein said shift judgment criteria includes a limit of a minimum vehicle speed above which said gear shift is permitted.

15. The control system according to claim 9, wherein said gear shift is performed when a current zone of said shift judgment criteria differs from a prior zone.

16. The control system according to claim 9, wherein said second calculating means is for calculating a required torque value based on said required horsepower value and said engine speed and calculating said required stroke intake air amount based on said required torque value.

17. The control system according to claim 9, wherein said throttle opening angle of said throttle valve is electrically established based on said required stroke intake air amount.

18. The control system according to claim 1, wherein said reference value calculating means calculates said reference value from an upshift function per each gear position written in said shift map based on said required horsepower, said upshift function corresponding to a horsepower curve under full throttle open condition per each gear position, and said judging means judges a gear shift toward upshift direction when said vehicle speed is larger than said reference value.

19. The control system according to claim 18, wherein said reference value calculating means calculates said reference value from a downshift function per each gear position written in said shift map based on said required horsepower, said downshift function being offset from said upshift function, and said judging means judges a gear shift toward downshift direction when said vehicle speed is smaller than said reference value.

20. A method for controlling an automatic transmission of a vehicle, comprising:

detecting an accelerator pedal opening angle;

detecting a speed of the vehicle;

calculating a required horsepower value based on the accelerator pedal opening angle and the speed of the vehicle;

calculating a reference value for gear shifting corresponding to said required horsepower value by reference to a shift map parameterizing vehicle speed and horsepower;

judging a need for a gear shift of said automatic transmission by comparing said vehicle speed with said reference value.

21. The method according to claim 20, wherein the shift map plot comprises a plurality of zones of acceptable gear positions, based on full throttle horsepower curves obtained for each gear position of the automatic transmission when the accelerator opening angle is maximum, plotted with respect to vehicle speed.

22. A method for controlling an automatic transmission of a vehicle, comprising:

detecting an accelerator pedal opening angle;

detecting a vehicle speed;

calculating a required horsepower value based on the accelerator pedal opening angle and the vehicle speed, with reference to required horsepower value calculating criteria; and judging whether a shift in gear of the automatic transmission is needed, based on the required horsepower value and the vehicle speed, by reference to shift judgment criteria.

* * * * *